May 31, 1960  A. R. CONSTANTINE  2,938,970
SEQUENCE TIMER
Filed Feb. 1, 1957  3 Sheets-Sheet 1
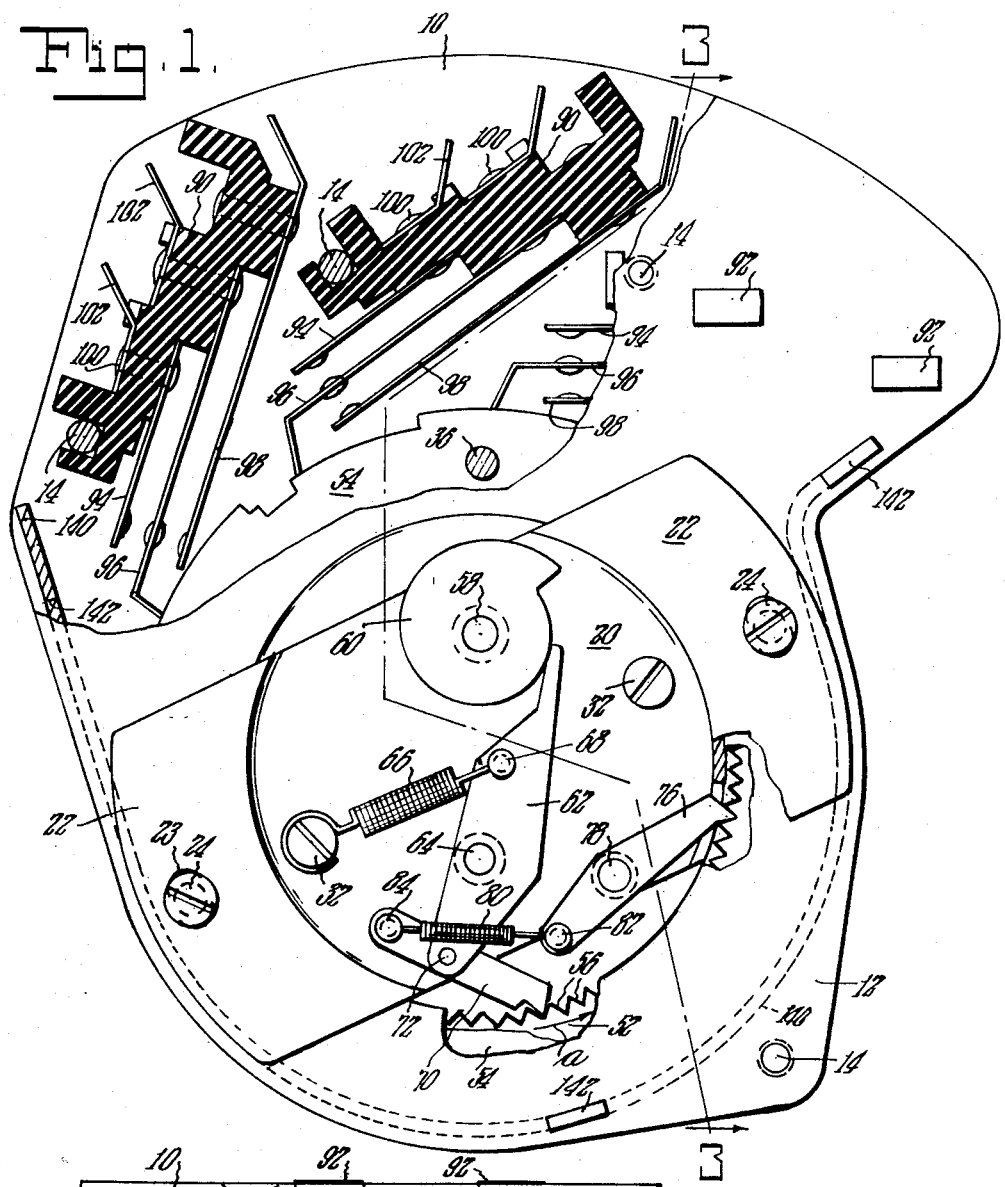
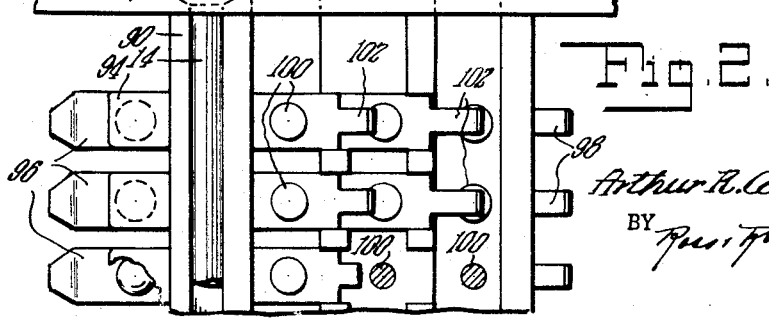
INVENTOR.
Arthur R. Constantine.
BY May 31, 1960   A. R. CONSTANTINE   2,938,970
SEQUENCE TIMER
Filed Feb. 1, 1957   3 Sheets-Sheet 2
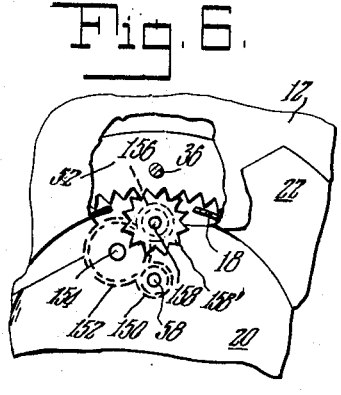
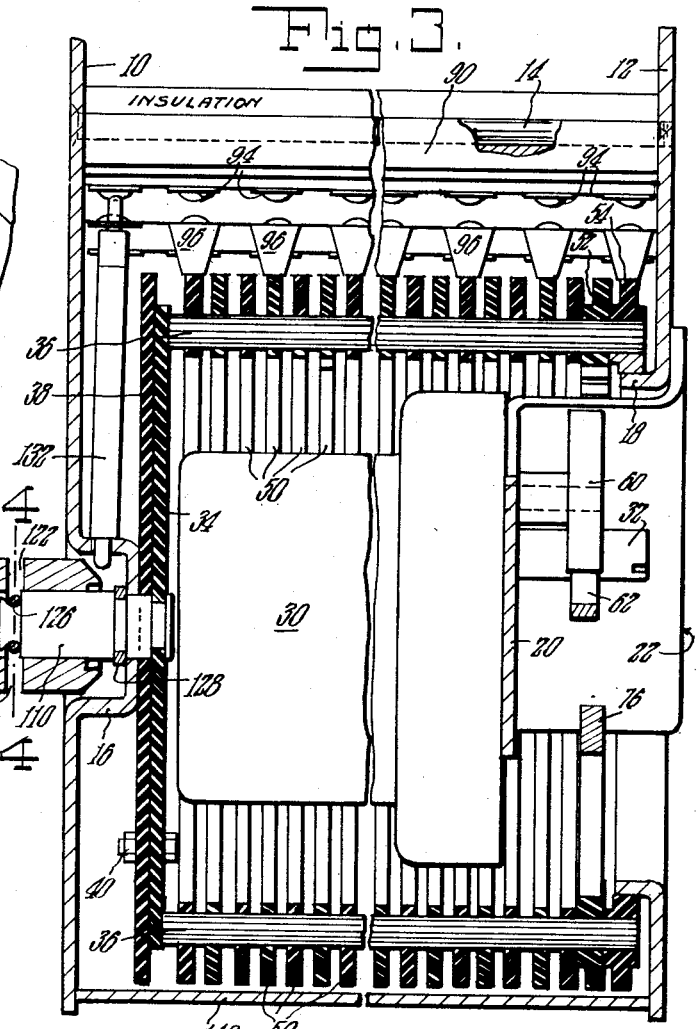
INVENTOR.
Arthur R. Constantine.
BY May 31, 1960  A. R. CONSTANTINE  2,938,970
SEQUENCE TIMER Filed Feb. 1, 1957  3 Sheets-Sheet 3

INVENTOR.
Arthur R. Constantine.
BY Rossi Ross, Atty.

United States Patent Office 2,938,970
Patented May 31, 1960

2,938,970
SEQUENCE TIMER

Arthur R. Constantine, Longmeadow, Mass., assignor to Controls Company of America, Schiller Park, Ill., a corporation of Delaware Filed Feb. 1, 1957, Ser. No. 637,831

16 Claims. (Cl. 200—38)

This invention relates to new and useful improvements in an electrical circuit controlling apparatus for automatically cycling a sequence of operations according to a predetermined program and is directed more particularly to the provision of a mechanism for controlling a fixed series of operations in an assembly such as an automatic washing machine and machines of other types.

The invention relates to timing apparatus for governing the starting, stopping and intermediate sequence of operations in a machine or system, where these operations are desired to occur more or less automatically.

The improved timer hereof has been devised primarily for controlling automatic washing or similar machines, and many features of the construction are concerned essentially or fundamentally with the requirements thereof. However, various features of the invention are also applicable to other machines for other uses, and it is to be understood that the aforesaid employment in a washing machine is recited only by way of illustration.

In its broadest aspects, this invention relates to improvements in sequential timers and the like. Such devices may be employed to deliver signals, generally electrical, in sequence over specified circuits, in selected sequence, and under conditions of timed control. Generally, also, such devices operate through a cycle of movements between an initial or beginning position and a terminal or concluding position; and generally these devices are preset or loaded by the operator whereupo they move through the desired cycle of movements, delivering the desired electrical signals in the proper sequence and timing, to the conclusion of the cycle or the series of signals. These signals may be sustained signals or circuit closures such as the delivery of current to a motor or other element, or they may be short intermittent signals. In any case, the sequential timer is intended to and does delivery its signals in proper sequence and timing, and sustains said signals for the selected time intervals.

An important feature hereof is to provide a sequential timer including a timing element which moves at uniform speed in the unloading direction, together with means which may be so formed that the releasing operations occur at different time intervals, depending on the desired timing of the operations of opening and closing various circuits controlled by the device. These time intervals at which successive releasing operations of the contact control unit occur may be uniform or may be of unequal durations.

The invention relates especially to an improved sequence switch adapted to close or open a plurality of electrical circuits in timed sequence. It has been devised primarily for controlling the timed sequence of operations in an automatic washing machine of the type in which different operations occur automatically, such as soaking, washing, rinsing, centrifugal drying, and the like. However, in its broader aspects, the invention is also adaptable to a myriad number of other uses, such as a program switch for controlling an automatically timed program of any type of a similar or equivalent nature.

One use for devices embodying the features of the present invention is for the control of various units and the various operations of an electrical washing machine. Such a machine includes the driving motor, various valves, and also gear and clutch devices or the like for effecting various connections and disconnections at different times during the cycle of operations of such washing machine. These elements must be controlled and operated in proper sequence, and for proper time intervals, according to the specific requirements of the particular machine with which employed.

Modern appliances have greatly increased the requirements of a sequence timer. Increased numbers of electrical circuits are necessary to control same, obviously requiring increasingly greater switching capacity within the timer.

Some electrical switching control is best met by use of contacts which are normally closed when at rest, and are opened mechanically by the timing mechanism. Other circuits are best controlled by being normally open, and by being closed mechanically by the timing mechanism.

Still other requirements, such as the reversing of motors and similar interlocked operations, are more safely performed by three position contact switches, i.e., by the use of three contact blades in each cam-actuated location, where in one position, the actuating blade is in contact with the lowermost blade, where in a second position, all of the circuits are open, and where in a third position, the actuating blade is in contact with the uppermost blade.

Whereas electrical switching capacity requirements have been increasing, the available space for the timing mechanism in modern appliances, such as an automatic washing machine, has been diminishing. For example, the current trend has been to incorporate the timing controls in a so-called back splasher apron which extends generally upwardly at the top rear of the appliance.

To meet the variety of new installation difficulties being encountered, some prior art timers have been built with the driving motor disposed laterally of the cams. Still others have been built with intricate drive mechanisms which accomplish power transfer functions only in order to save axial depth. In certain known instances, it has even been necessary to mount the timer remotely and to reach the control point spaced therefrom by means of elongated shafts and equivalent elements.

It is a principal object of this invention to provide a timing mechanism offering a maximum of electrical switching capacity in an absolute minimum of space both overall or in thickness.

Another object hereof is to obtain a timer with a short dimension from the front to the rear thereof by locating the drive motor and related actuating mechanism entirely or substantially within, or inside of, the bank of timing cams.

Another object is to provide a timer having ring-like cams of sufficiently large diameter so as to permit large tolerance in manufacture and still to control accurately the electrical sequences required.

Still another object hereof is to locate a plurality of contact carrying blocks in such an interlocked manner on one side of the timer and/or within the cams as to permit the location of the timing instrument in closer proximity to the side walls or corners of the machine on which installed than has heretofore been possible.

It is another object to provide means, without additional expense, for providing groups of contact switch blades with contacts which are normally closed, or with contacts which are normally open, or with three position blades for controlling two circuits, or with groupings of any combination thereof, all as may be desired for the specific mission seeking accomplishment.

A still further object of this invention is to provide a terminal arrangement connected with contact blades which will permit the use of external wiring equipped with multiple terminal blocks.

Additionally, another object is to provide a variable rate of actuation of the driven cams such as found desirable on a combination washer and dryer, so that a relatively large percentage of the rotation may be used for the wash cycle with its many circuit changes, and a relatively small percentage of the rotation, but with a relatively longer time period, may be used for the dry cycle with its few circuit changes.

A further object is to provide a sequence timer with one or more timing or program cams which are duplex in nature in that they may control operating sequences on both their outside diameters or peripheries and on their inside diameters or peripheries. That is to say, a timing or program cam hereof may offer an economic advantage by providing multiple functions, such as the controlling of electrical sequences on its outer periphery, and the performing of other functions on its inner periphery, as for example providing driving teeth, supporting bearing surfaces, or the like.

A further object is to provide a sequence timer which may be used not only for purposes where all of the functions are fixed in the design of the program cams, but also for purposes such as in the case of a combination washer and dryer where the drying time may be adjustably set by the user so as to suit the quantity, quality and other characteristics of the fabrics being washed and dried.

In the present invention, I provide means operable positively to rotate the controller in periodic movements of predetermined length.

I provide a simple, inexpensive, accurate and positive control means operable to automatically initiate and terminate operations of a plurality of electrically operated or controlled mechanisms in given timed sequence and to repeat the series of successive operations to provide for the cyclic operations of the machine.

I further provide a control means of the character referred to which may be quickly, easily and inexpensively altered, adjusted or conditioned to change the sequence of operations and the time, number and duration thereof.

I provide a simple timing mechanism which can be economically built in large quantities, and the parts of which are readily accessible for repair and adjustment. Various features of novelty relate to the mounting of an electric motor or other drive means within a bank of timing disc cams which operate the switch contacts, to the mounting of the cams as a bank or unit, to the arrangement and mounting of the cam-operated contacts, and to the construction and arrangement of the casing in which these parts are housed.

I provide an improved mechanism operable by a constant spreed motor and adapted to drive circuit controlling means in a single direction positively and in periodic steps of predetermined length.

I provide a novel construction of the type wherein the major working parts are generally concentrically disposed as to each other to the end that a structure of relatively thin proportions is provided, making same especially applicable in situations where narrow space requirements are presented. Such a provision serves to eliminate the now present objectionable inconveniences where the space factor is such an all-controlling one.

This construction further offers the possibility of locating the structure at various angles relative to the device with which it is associated so as to best satisfy these limitations and the specific requirements thereof.

In its disclosed embodiment, there is contemplated a program sequence timer which incorporates a plurality of relatively large, uniform-diameter disc cams which are mounted between a pair of flat sided front and rear frame plates. This centralized system of timing cam discs is rotatable in a predetermined direction in periodic steps. Within the system a constant speed motor is concentrically mounted. Each cam disc is brought into play at a predetermined interval of a cycle and is rendered effective for a predetermined duration.

Automatic supervision is made contingent upon prerequisite establishment of proper operating conditions and is susceptible of being arrested in the event of certain developments during a normal or proper performance cycle.

That is to say, provisions have been made for suspending the continuation of the operative cycle in the event of certain contingencies such as a failure of water supply, and the like.

Additionally, various stages of the performing cycle may be wholly or partially repeated for the sake of achieving accentuated action in respect to any of the detailed performances which constitute the full cycle.

In order to make the industrial production and assembly of appliances of the type herein contemplated a more efficient and profitable undertaking from an industrial viewpoint, the timing apparatus constituting the essence of the present invention has been designed so as to be particularly compact while yet to be readily accessible and to dispose its various control contacts in such a manner as to render them more easily accessible for wiring and installation purposes. Too, said apparatus is inherently of unique design so that it may be located in a position relatively remote with respect to the moving portions of the washing machine and to thus be more convenient for overseeing and regulation as desired and/or required.

Further, the timing apparatus has been reduced in its complexity of parts in a manner such that the entire control is accomplished by an operating mechanism which is located adjacent the motor and connects directly to the inside of one of the cams without necessitating any gearing. That is to say, a new concept in the conservation of space is herein provided so as to meet the normal modern demands in that the motor is mounted concentrically within the cam discs themselves. The operating mechanism is located adjacent the motor within an end cap and is connectable directly to the interior of the cam discs without the additional requirement of delicate and costly gearing, as aforesaid. Such a new and novel combination of elements facilitates the elimination of practically all backlash and eliminates the necessity for the additional space required for the conventional drive means.

Additionally, the switch blades are mounted in a plurality of banks which may be easily assembled and inspected in sub-assembly.

Broadly speaking, the invention contemplates an automatic cyclic control switch of the type which is motor driven and which is provided with manual means for advancing the switch in order to shorten, or conceivably even eliminate, one or more of the periods of the cycle. It relates to a sequential controller for automatically controlled machines such as washing machines incorporating a device operated by a suitable electric motor and capable of delivering an intermittent or step-by-step forward motion from a source of constant rotary motion.

The improvements specifically relate to electric switch mechanisms in which a plurality of rotary switch actuating members are combined with a means for imparting an intermittent or step-by-step movement thereto.

The invention possesses other objects and features of advantage, some of which, with the foregoing, will be set forth in the following description of the preferred form of the invention which is illustrated in the drawings accompanying and forming part of the specification. It is to be understood, however, that variations in the disclosure made in said drawings and description may be adopted within the scope of the invention as set forth in the claims appended hereto.

Other objects and advantages will become apparent from the following description taken in conjunction with the accompanying drawings in which:

Fig. 1 is a rear elevational view of the device of the invention with certain parts broken away for purposes of clarity;

Fig. 2 is a top plan view of an end portion of one of the switch blade carriers of the invention showing its relationship with the adjacent front frame plate;

Fig. 3 is a broken sectional view on the line 3—3 of Fig. 1;

Fig. 4 is a sectional view on the line 4—4 of Fig. 3;

Fig. 5 is a front elevational view of a multiplicity of the cams of the invention shown arranged in a haphazard manner merely for purposes of illustration;

Fig. 6 is a partial rear elevational view similar to Fig. 1 showing certain features in a slightly modified version of the invention.

Figure 7:
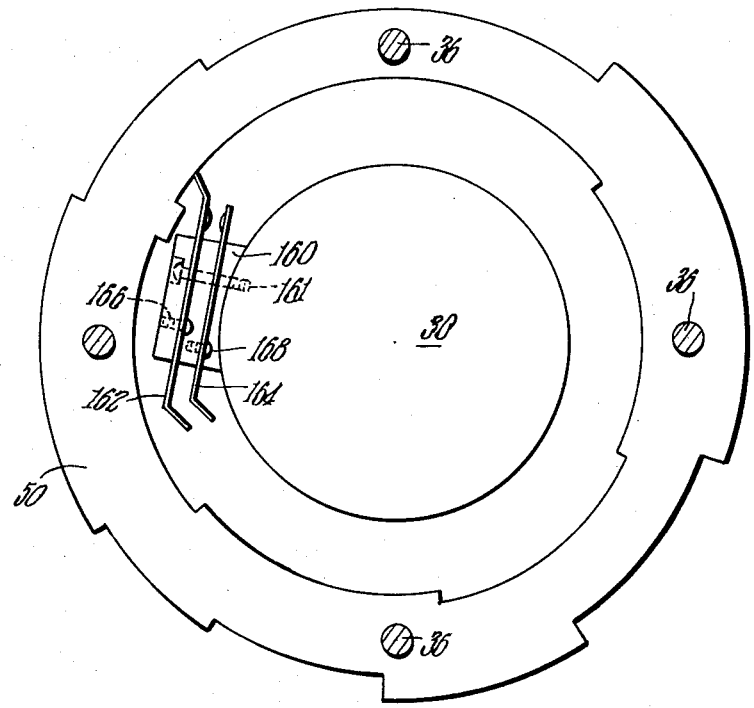
Fig. 7 is an end elevational view at the front end of the motor showing one of the timing cams incorporating certain other features of the invention.

In the following description and claims, various details will be identified by specific names for convenience. These names however are intended to be as generic in their application as the art will permit.

Referring now to the drawing more in detail, in which similar characters of reference indicate corresponding parts in the several figures and referring more particularly to the preferred form of my invention selected for illustrative purposes, it will be seen that the device includes flat sided, front and rear frame plates 10 and 12 respectively which are held in spaced parallel relation by means of spacing pins or screws such as 14 connecting therebetween in the usual manner.

The front frame plate 10 is provided with a more or less centrally disposed, inwardly extending, boss or hub 16 having an opening extending therethrough.

The rear frame plate 12 is provided with an enlarged central opening therethrough and an inwardly extending annular flange portion 18 around said opening.

The openings through the front and rear frame plates are aligned as to each other.

A generally U shaped motor bracket 20 is of such dimension as to be receivable within the enlarged opening of the rear frame plate 12 and is provided with ears 22 for abutment against the rear frame plate.

The ears 22 are secured to the member 12 by screws 24 extending through slots 23 in said ears and engaging member 12 thereby permitting adjustability of the motor bracket relative to the rear frame plate.

A motor 30 is secured to the inner wall of the motor bracket 20 by means of posts 32 which are threadedly engageable with studs (not shown) extending through said inner wall.

By such arrangement, the motor may be held between and relative to the front and rear frame plates with adequate ventilation being provided for the motor.

It is also to be appreciated that by such arrangement the motor and driving or operating mechanism, shortly to be described, may be easily removed from the construction for inspection, maintenance or other purposes without disturbing the switch mechanisms, also subsequently to be referred to.

A cam drive plate assembly includes an annular cam drive plate 34 and a plurality of cam drive studs 36 which are fixed to the plate at spaced points adjacent the outer periphery thereof and extend inwardly therefrom as will be best observed by reference to Fig. 3.

An outer annular disc or plate 38 may be engaged with the cam drive plate 34 as by a bolt 40 or the like, extending through a slot (not shown) in the plate 38 and may, if desired, be provided on its outer peripheral edge with cam profiles for the actuation of a related switch (not shown). Said plate 38 may be circumferentially adjustable relative to the cam drive plate 34 by means of the slot therein through which bolt 40 is received so as to attain a shortened or extended program at the end of a cycle. The plate 38 may be manually adjusted relative to the plate 34 by an accessible manually engageable means, not shown.

The cam drive plate assembly is mounted on the inner end of a shaft 110 later to be described.

The cam drive plate 34 may be fixed to the shaft 110 and said shaft 110 may be rotatable in the hub 16.

Said member 34 and part of the hub 16 are held against displacement by a C ring 128 in a groove of the shaft 110 as shown.

A plurality of program cams such as 50, 52 and 54 may be mounted on the cam drive studs 36 in spaced parallel relation, the cam drive studs being serrated, knurled, or otherwise formed so as to hold the cams in any desired relation as to each other. Conceivably shims or spacers may be provided on the cam drive studs to accomplish this same result. Also conceivably, the program cams themselves may be provided with hub portions adjacent the cam drive stud openings therein whereby any predetermined spacing between the centers of adjacent cams may be obtained.

The cams are of relatively large diameter and are ring-like in form with large central openings as shown in Figs. 3 and 5 so as to provide a space therewithin for the motor 30. That is to say, the invention envisions a new concept inasmuch as the cams are mounted on the cam drive plate assembly which is disposed between the front and rear frame plates and the motor in turn is mounted concentric with and wholly, within the cams, all to the end that space is conserved so as to meet the aforedescribed modern demands. It is to be noted that the entire timing apparatus is thus constituted a unitary and compact mechanism adaptable to mounting in a reduced area of space in convenient apertured location.

In Fig. 3, I have illustrated a great plurality of cams 50, one cam 52 and one cam 54, but it will be understood that any greater or lesser number of cams may be employed depending upon the number of automatic operations in the particular program involved.

The outer peripheries of each of the cams may be provided with cam profiles, such as may be discerned by reference to Fig. 5, it being understood that same are merely by way of illustration. The shape of the cam profile of each of the cams may be varied to suit the particular program requirements involved, those shown in Fig. 5 being typical.

The many cams 50 are each identified as timing cams.

The endmost or rearmost cam 54 identified as a timing and internal bearing cam has a dual function, same having the aforementioned cam profile on its outer diameter and having an internal diameter of a dimension to permit its internal bearing cam function, the internal surface of the cam bearing upon the outer annular surface of the flange portion 18 of the rear frame plate 12. See Fig. 3.

Another of the cams, specifically cam 52 identified as a timing and internal driven cam likewise has a dual function, in that it is provided with an annular row of teeth 56 on its internal diameter so as to enable it to function as an internal driven cam through an operating mechanism now to be described.

The operating mechanism is located adjacent motor 30 and within motor bracket 20 so as to be confined within the space between the front and rear frame plates 10 and 12 and further so as to be connected directly to the cams, to the end that no additional space or area is required for the drive and further to the end that backlash is practically totally obviated.

Drive shaft 58 of the motor 30 carries a motor cam 60 at its outer free end, which cam may have any desired number of rising lobes so as to accomplish any predetermined motion, as will be observed.

Upon rotation, the motor cam 60 engages and swings the free end of a cam follower 62 about a cam follower stud 64 fixed to and extending upwardly from the motor bracket 20.

A cam follower spring 66 has one end engaged with one of the posts 32 and an opposite end engaged with a stud 68 on the cam follower 62 whereby the cam follower is held against the motor cam at all times.

An actuating pawl 70 is swingably mounted on the outer end of the cam follower 62 by means of a stud pin 72 and has a free outer end thereof which engages the teeth 56 on the inner peripheral edge of the cam 52.

As the motor cam 60 rotates counterclockwise, the cam follower 62 is swung clockwise to swing the actuating pawl 70 so that it clicks past one or more teeth 56 in the cam 52. When the cam end of the cam follower 62 drops from the lobe of the motor cam 60, spring 66 pulls the member 62 counterclockwise whereby the cam 52 is rotated in the direction of arrow $a$.

A detent or holding pawl 76 is swingable on a detent pawl stud 78 fixed to the motor bracket 20 and has a finger engageable with the teeth of the cam 52 as shown and urged radially inward thereagainst by means of a detent pawl spring 80 having one end fixed to a stud 82 on the detent pawl and an opposite end fixed to a stud 84 on the actuating pawl as shown.

The detent pawl functions with the movements of the cam 52 and is engageable therewith to prevent backward rotation of the cam.

It will be understood that the rotation of the continuous or incremental as may be desired to suit the particular program desired, the aforedescribed operating mechanism being illustrated only as an example of one embodiment of the invention wherein the parts are combined and arranged in accordance with one mode which I have devised for the practical application of the principles of the invention.

The switches and mountings therefor will now be described.

One or more switch blade carriers 90 formed from suitable nonconducting material may be provided, each being held relative to the front and rear frame plates 10 and 12 between which it is disposed by means of ears 92 extending outwardly from the opposite ends thereof, which ears are receivable in appropriate openings in the front and rear frame plates.

The carriers 90 are provided with elongated grooves in which the previously mentioned members 14 are seated. See Figs. 1 and 2.

The carriers 90 carry longitudinally spaced switch mechanisms. Each switch mechanism as in the form of the invention being disclosed be in the form of a single-pole, double-throw, or three position switch and includes upper, actuating, and lower blades 94, 96 and 98 respectively.

Understandably switch mechanisms having blades which are normally closed, or contacts which are normally open, or any desirable combination thereof can be employed. That is, the timing mechanism of this invention may be assembled with any desired combination of circuits.

Each blade is fixed to the carrier by a rivet 100 passing therethrough and is connected to a related pig tail 102 thereby.

By means hereof, each switch offers three positions attainable by actuation of its cam as follows: in one position, the actuating blade 96 will be in contact with the lower blade 98, in a second position, all of the circuits are open as shown in Fig. 1, and in a third position, the actuating blade 96 will be in contact with the upper blade 94.

In the illustration, the actuating blade 96 is held away from blade 98 by the periphery of its cam. When allowed by the cam, the blade 96 is formed to contact blade 98.

In other words, each switch as shown being of the single-pole, double-throw type, the actuating blade 96 is normally in contact with the lower blade 98.

Any equivalent switch mechanism may be suitable employed in lieu of the above.

The switch blades are mounted on their respective carriers in such manner that they may be easily assembled and inspected in sub-assembly.

Three of such carriers are shown and it will be appreciated that they are located relative to each other and to the other components as to be each disposed relatively close to the rotating bank of cams.

For appliances requiring a reduced number of circuits, an appreciable economy can be effected by omitting not only certain of the cams but also one or more of the switch blade carriers to the end that overall dimensions may obviously be reduced. Accordingly, limitation of this invention should be made only as determined by a proper interpretation of the terms used in the subjoined claims.

At the front of the construction, the main shaft 110 previously referred to is suitably associated with the cam drive plate 34 and extends outwardly therefrom through the opening in the hub 16.

A knob bushing 116 upon which dials and the like may be mounted is reciprocable on the outer free end of shaft 110 and is held against rotation relative thereto by means of a pin 120 receivable in a slot 118 in the shaft.

The knob bushing is slotted on opposite sides as at 122 and 124 and a resilient retaining spring 126 is receivable therein so as to grip the main shaft 110 in one or the other of a pair of longitudinally spaced peripheral grooves such as 127 as shown in Fig. 3.

As the knob bushing 116 is moved relative to the front frame plate 10, the retaining spring is urged from one groove to the other in the well known manner whereby the knob bushing may be held in either position such as on or off position.

The inner end of the knob bushing 116 has a cammed forward end face 130 which is adapted to urge an actuating pin 132 upwardly and thereby to actuate a blade of a switch device. As shown the upper end of member 132 extends loosely through a switch blade. The switch blade so actuated may be in a circuit which, when so actuated, will start the cycle of the timing mechanism.

As the knob bushing 116 is pulled outwardly, the actuating pin 132 is faced downwardly by the switch blade at its upper end.

A generally U-shaped enclosure from 140 may be provided to enclose the space between the front and rear frames adjacent the greater portion of the side edges thereof. The frame has outwardly extending side ears or tabs 142 which are receivable within aligned openings through the front and rear frame plates whereby rigidity is provided the entire structure.

In the modification of Fig. 6, a pinion 150 is fixed to the motor shaft 58. A gear 152 rotatable on a stud 154 of motor bracket 20 is in mesh with pinion 150. A pinion 156 rotatable on stud 158 of motor bracket 20 meshes with the gear 152 and a tooth driver 158' integral with the pinion 156 is in mesh with and serves to rotate the driven cam.

Any other equivalent arrangement desired may be employed to bring about continuous or step-by-step rotation of the cam 52.

Additionally, as shown in Fig. 7, one of the timing cams 50 may be provided on the inner periphery thereof with cam profiles such as shown. The shape of the cam profile may be varied to suit the particular program requirements involved, the one shown in Fig. 7 being typical. More than one of the cams 50 can be so formed, if desired.

A support block or switch blade carrier 160 may be fixed by a screw 161 to a side of the motor 30 to which blades such as 162 and 164 of a switch mechanism may be fixed as by rivets 166 and 168 or the like. The switch mechanism may be in the form of a single-pole single-throw switch and includes the blades as aforesaid which may be normally closed or normally open as desired.

As many of these switch mechanisms may be associated with as many of the timing cams as may be desired.

As the bank of cams rotates, the switch mechanism or switch mechanisms on both peripheries are thereby actuated.

It is to be appreciated that in the aforedescribed manner, the cams, or certain thereof, serve duplex functions.

Although particular embodiments of my invention have been described, it will be understood by those skilled in the art that the object of the invention may be attained by use of constructions different in certain respects from those disclosed without departing from the underlying principles of the invention; for instance.

I therefore desire by the following claims to include within the scope of my invention all such variations and modifications by which substantially the results of my invention may be obtained through the use of substantially the same or equivalent means.

Having thus described my invention, what I claim is:

1. In an automatic timer for performing a plurality of electrical switch operations in a predetermined sequence, a front frame, a rear frame spaced from said front frame, said rear frame having an inwardly extending hollow annular flange portion, a motor bracket secured to said rear frame and being receivable within the hollow of said rear frame, a driving motor secured to said motor bracket and disposed between said front and rear frames, a main shaft extending inwardly from said front frame and disposed concentrically relative to the hollow flange portion of said rear frame, a cam plate fixed to said main shaft and having circumferentially spaced cam studs extending outwardly therefrom, a plurality of ring-like cams fixed to the cam studs of said cam plate in spaced relation therealong, one of said cams being rotatable on the annular flange portion of said rear frame, another of said cams being provided with circumferentially arranged internal teeth, means operably connecting said driving motor and the teeth of the said one of said cams for effecting rotation of the plurality of said cams, a plurality of switch carriers extending between said front and rear frames and being spaced concentrically relative to said cams, and a plurality of independently operable switch devices spaced along each of said switch carriers, said cams having peripheral cam profiles for engaging and operating said switch devices in accordance with a predetermined program.

2. In an automatic timer for performing a plurality of electrical switch operations in a predetermined sequence, a front frame, a rear frame spaced from said front frame, said rear frame having an inwardly extending hollow annular flange portion, a motor bracket having an inwardly depressed portion receivable within the hollow of said rear frame, a driving motor secured to said motor bracket and disposed between said front and rear frames, a main shaft extending inwardly from said front frame, a cam plate fixed to said main shaft, a plurality of ring-like cams fixed to said cam plate in spaced relation therealong, one of said cams being rotatable on the flange of said rear frame, another of said cams being provided with circumferentially arranged internal teeth, means operably connecting said driving motor and the teeth of the said one of said cams for effecting rotation of the plurality of said cams, a plurality of switch carriers extending between said front and rear frames, and a plurality of independently operable switch devices spaced along each of said switch carriers, said cams having peripheral portions for engaging and operating said switch devices.

3. A timing mechanism of the character described comprising a series of ring-like cams, a pair of spaced end plates forming a frame, means for rotatably supporting said ring-like cams as a unit for rotation between the end plates of said frame, a motor, a driving mechanism driven by said motor, and a means to support said motor and driving mechanism on one of said end plates in position to support said motor in the interior of said ring-like cams, and a drive connection between said motor and said driving mechanism coacting with the interior of said cams to rotate the same from said motor through said driving mechanism and said driving connections, a plurality of switch units each carrying a plurality of switches, said switch units also mounted between said end plates in position to be actuated by said cams during rotation thereof.

4. A timing mechanism as in the preceding claim 3 wherein the switches of each unit of the plurality of switch units contact a portion only of said cams while the remainder of said cams are contacted by the switches of other switch units, whereby said plurality of switch units may be grouped relatively close together and occupy a relatively small portion of the circumference around said cams.

5. A timing mechanism as in claim 3 in which the drive connection between said driving mechanism and the interior of said ring-like cams comprises a ratchet wheel on the interior of said one of said cams and a ratchet and pawl mechanism in said driving connection whereby said ring-like cams are driven together in a step-by-step movement on rotation by said motor.

6. In a timing mechanism in combination, a pair of spaced end plates forming a frame, a bank of ring-like cams secured together to rotate as a unit, a circular bearing surface formed on the inside of at least one of the end cams of said bank forming a bearing for mounting said cam bank for rotation between said end plates, a cam profile on the outer peripheral edge of each of said cams, driving means for driving said bank of cams disposed concentrically within said bank, and a plurality of switches, each of the switches of said plurality thereof adapted to be actuated by and responsive to one of the cams of said bank.

7. In an automatic timer having its parts arranged for conservation of space while retaining advantages of separable parts and unitary subassemblies comprising a plurality of ring-like cams, means to secure said cams together in a unitary structure forming a hollow cylindrical cam bank with a series of cam profiles on the outer peripheral surface thereof, a pair of end plates forming a frame, and means for supporting said unitary cam bank for rotation between said end plates, driving means for driving said bank disposed concentrically within said bank and supported on one of said end plates, a plurality of switch groups, each group supported on and between extending portions of said end plates, each switch of a switch group of said plurality of groups thereof adapted and positioned to be actuated by and responsive to one of the cams of said bank, and certain of the cams of said bank having means formed thereon for cooperating with said driving means for rotation of said bank from said driving means.

8. An automatic timer as in claim 7 characterized by at least one of the end cams of said bank having a bearing formed on the inner peripheral edge thereof cooperating with its adjacent end plate to mount said bank for rotation between said end plates.

9. An automatic timer as in claim 7 further characterized by certain of the cams of said plurality thereof having cam profiles on the inner peripheral edges thereof and certain of said switch groups having contacting blades for actuation by said inner cam profiles.

10. In a timer, the combination of, a frame, a cam bank including a plurality of hollow annular cams having inside and outside peripheries, said cams being rotatably supported in the frame, a motor, drive means operatively connecting the motor to the cam bank to effect rotation thereof, cam profiles on the outer peripheries of the cams in the cam bank, a cam profile on the inside periphery of at least one of the cams, and switch means operable by said cam profiles.

11. In a timing mechanism, in combination, a pair of spaced end plates each having a central opening, a manually operated shaft extending through an opening in one plate, the other end plate having an inwardly projecting flange around the opening in the plate, a bank of cams rotatably mounted and supported at one end by the bearing of the inner periphery of a cam on the said annular flange and supported at the other end by said manually operated shaft, drive means operatively connected to the cam bank including a motor located within the cam bank, gear means driven by the motor and located within the cam bank, and means on the inside of one of the cams for cooperation with said gear means for transmitting motion to the cam bank, and switch means adapted for cooperation with said cams.

12. A timing mechanism of the type providing sequential actuation of electrical switches by timed rotation of cams and adapted for disposition within a relatively shallow depth, said mechanism comprising a pair of spaced frame members, a plurality of ring-like cams each having a switch actuating contour, said cams secured together forming a unitary assembly with an open central region, said unitary assembly of cams having end portions rotatably supported on said frame members to provide for rotation of said cams between said frame members, one of said frame members having an opening forming an access to said open central region through said frame member, a timer drive motor supported by said one frame member and so positioned relative to said frame member and said opening as to project said motor into said open central region in supported space-saving relationship with said unitary assembly of cams, and a drive connection from said timer drive motor to said cams to drive cams in rotation in timed switch actuating sequence.

13. A sequential timing mechanism as in claim 12 having projecting portions of said frame members on one side of said unitary assembly of cams, a bank of switches disposed between and supported by said projecting portions of said frame members at one side of said cams and being operable in timed sequence by said actuating contours of said cams on the aforesaid rotation of said cams.

14. A sequential timing mechanism as in claim 13 in which the switches are grouped in a plurality switch banks each provided with a plurality of switches and operable by said cams and being steeply inclined with respect to the cams and nested so that each bank of switches overrides or underlies an adjacent bank.

15. A sequential timing mechanism as in claim 12 in which a member rotatable independently of said timer drive motor is connected to rotate said cams and extends through the frame member on the opposite end of the said unitary assembly of cams from said motor supporting frame member.

16. A sequential timing mechanism adapted for disposition within a relatively shallow depth comprising, a pair of spaced frame members, a plurality of ring-like cams each having a switch actuating contour, a plurality of serrated cam drive studs securing said ring-like cams together in spaced parallel relationship forming a unitary assembly of cams rotatably supported on said frame members to provide for rotation of said cams between said frame members, one of said frame members having an access opening to said open central region, a timer drive motor supported by said frame member and so positioned relative to said frame member as to project said motor into said open central region in supported space-saving relationship with said unitary assembly of cams, and a drive connection from said timer drive motor to said cams to drive said cams in rotation in timed switch actuating sequence.

References Cited in the file of this patent

UNITED STATES PATENTS

| | | |
|---|---|---|
| 2,045,251 | Raber | June 23, 1936 |
| 2,176,638 | Nordberg et al. | Oct. 17, 1939 |
| 2,192,313 | Huth et al. | Mar. 5, 1940 |
| 2,240,498 | Elliott | May 6, 1941 |
| 2,240,499 | Elliott | May 6, 1941 |
| 2,249,753 | Elliott | July 22, 1941 |
| 2,420,019 | Shrack | May 6, 1947 |
| 2,537,929 | Daly et al. | Jan. 9, 1951 |
| 2,647,962 | Batcheller | Aug. 4, 1953 |
| 2,666,821 | Cannon | Jan. 19, 1954 |
| 2,703,347 | Constantine | Mar. 1, 1955 |
| 2,782,012 | Coyne et al. | Feb. 19, 1957 |
| 2,810,798 | Taylor | Oct. 22, 1957 |
| 2,828,375 | Holzer | Mar. 25, 1958 |